United States Patent
Rentsch et al.

(10) Patent No.: US 10,119,032 B2
(45) Date of Patent: Nov. 6, 2018

(54) PROCESS FOR THE PREPARATION OF A MINERAL FILLER PRODUCT

(71) Applicant: Omya International AG, Oftringen (CH)

(72) Inventors: Samuel Rentsch, Aarburg (CH); Fabio Ippolito, Oftringen (CH); Matthias Buri, Rothrist (CH); Patrick A. C. Gane, Rothrist (CH)

(73) Assignee: Omya International AG, Oftringen (CH)

( * ) Notice: Subject to any disclaimer, the term of this patent is extended or adjusted under 35 U.S.C. 154(b) by 147 days.

(21) Appl. No.: 15/116,373

(22) PCT Filed: Feb. 13, 2015

(86) PCT No.: PCT/EP2015/053069
§ 371 (c)(1),
(2) Date: Aug. 3, 2016

(87) PCT Pub. No.: WO2015/124500
PCT Pub. Date: Aug. 27, 2015

(65) Prior Publication Data
US 2016/0347954 A1  Dec. 1, 2016

(30) Foreign Application Priority Data
Feb. 21, 2014 (EP) .................................... 14156110

(51) Int. Cl.
*C08K 9/04* (2006.01)
*C09C 1/02* (2006.01)

(52) U.S. Cl.
CPC ................ *C09C 1/021* (2013.01); *C08K 9/04* (2013.01); *C01P 2004/62* (2013.01); *C01P 2006/12* (2013.01); *C08K 2201/005* (2013.01); *C08K 2201/006* (2013.01)

(58) Field of Classification Search
CPC .... C09C 1/021; C08K 9/04; C08K 2201/005; C08K 2201/006
USPC ....................................................... 524/425
See application file for complete search history.

(56) References Cited

U.S. PATENT DOCUMENTS

| | | | |
|---|---|---|---|
| 3,923,717 | A | 12/1975 | Lalk et al. |
| 4,136,830 | A | 1/1979 | Manfroy et al. |
| 4,407,986 | A | 10/1983 | Nomura et al. |
| 2010/0025507 | A1 | 2/2010 | Buri |

FOREIGN PATENT DOCUMENTS

| | | | | |
|---|---|---|---|---|
| EP | 0100947 | A1 | 2/1984 | |
| EP | 0100948 | A1 | 2/1984 | |
| EP | 0129329 | A2 | 12/1984 | |
| EP | 0046573 | B1 | 2/1986 | |
| EP | 0261039 | A1 | 3/1988 | |
| EP | 0325114 | A2 | 7/1989 | |
| EP | 0380430 | A1 | 8/1990 | |
| EP | 0542644 | A1 | 5/1993 | |
| EP | 0779342 | A1 | 6/1997 | |
| EP | 0889102 | A2 | 1/1999 | |
| EP | 2371766 | A1 | 10/2011 | |
| EP | 2447213 | A1 | 5/2012 | |
| EP | 2524898 | A1 | 11/2012 | |
| EP | 2546410 | A1 * | 1/2013 | ............... D21C 9/08 |
| EP | 2546410 | A1 | 1/2013 | |
| FR | 2351706 | A1 | 12/1977 | |
| WO | 9112278 | A1 | 8/1991 | |
| WO | 9961521 | A1 | 12/1999 | |
| WO | 0020336 | A1 | 4/2000 | |
| WO | 2012055739 | A1 | 5/2012 | |

OTHER PUBLICATIONS

Godard P et al: "Tensile Behaviour of Polystyrene Filled With Calcium Carbonate", The 5th International Fillers Conference Filplas, May 19-20, 1992, Manchester, London, GB, May 19, 1992, pp. 1-16.*

Godard et al. Tensile behaviour of polystyrene filled with calcium carbonate. The 5th International Fillers Conference Filplas 19-20, May 19, 1992.

* cited by examiner

*Primary Examiner* — Kelechi C Egwim
(74) *Attorney, Agent, or Firm* — Amster, Rothstein & Ebenstein LLP

(57) ABSTRACT

A process for the preparation of a mineral filler product is disclosed, the process comprising a step of wet grinding a calcium carbonate-containing material in a mixture obtained by contacting the calcium carbonate-containing material with at least one grinding agent selected from specific styrene-maleic anhydride co-polymers and/or specific derivatives of styrene-maleic anhydride co-polymers.

22 Claims, No Drawings

PROCESS FOR THE PREPARATION OF A MINERAL FILLER PRODUCT

CROSS-REFERENCE TO RELATED APPLICATIONS

This is a U.S. national phase of PCT Application No. PCT/EP2015/053069, filed Feb. 13, 2015, which claims priority of European Application No. 14156110.0, filed Feb. 21, 2014.

The present invention relates to a mineral filler product which may be used in a multitude of applications, for example in polymer compositions, in paper making, paper coatings, agricultural applications, paints, adhesives, sealants, construction applications, or cosmetic applications.

Well-known mineral fillers comprise, for example, natural ground calcium carbonate (GCC) and precipitated calcium carbonate (PCC).

For the preparation of GCC it has been quite common to use water soluble polymers based on partially or totally neutralized polyacrylic acids, polymethacrylic acids, their derivatives and salts thereof, as grinding aids and dispersing agents in a wet grinding process to provide aqueous mineral suspensions. Such water soluble polymers are known, for example, from European patent applications EP 0 046 573, EP 0 100 947, EP 0 100 948, EP 0 129 329, EP 0 261 039, EP 0 516 656, and EP 0 542 644.

EP 0 380 430 discloses a process for grinding calcium carbonate in an aqueous medium in the presence of a water-soluble grinding agent in a small quantity and which is characterized in that the grinding medium comprises grinding bodies, the aqueous phase containing the grinding agent and the calcium carbonate to be ground in suspension is maintained at a temperature of less than 60° C. during the grinding operation. The suspension produced by the grinding and the ground calcium carbonate collected after removal of the aqueous phase can be applied in the fields of mass filling and paper coating and of fillers for paint and plastics.

In EP 0 779 342, styrene-maleic anhydride co-polymers having an average molecular weight of from 1'000 to 3'000 g/mol and preferably from 1'500 to 2'000 g/mol are used as dispersion agents and/or for the treatment of mineral fillers of basic type or having surfaces with free hydroxyl groups in thermoplastic resins, homopolymers without aryl groups and a unique carbon skeleton or co-polymers with aryl groups and a skeleton composed of solely carbon and oxygen in which the content of oxygen atoms does not exceed 22 wt.-%. Also disclosed are thermoplastic compositions containing said co-polymers.

EP 0 889 102 relates to a pigment dispersion for an aqueous ink. The pigment is dispersed in a liquid by a dispersing agent, wherein the dispersing agent comprises a styrene-maleic anhydride co-polymer (SMA), a reaction product of the SMA co-polymer and an alcohol, or a combination of the SMA co-polymer and the SMA co-polymer/alcohol reaction product. The weight ratio of the pigment to the dispersing agent in the dispersion is from about 5:1 to about 9:1, and preferably from about 6:1 to about 8:1. The pigment comprises at least about 33 wt.-% of the total weight of the dispersion, preferably at least about 36 wt.-% of the dispersion, and most preferably at least about 40 wt.-% of the dispersion. An aqueous ink is prepared combining the pigment dispersion with an emulsion comprising a polymer stabilized in water. The pigment comprises at least about 10 wt.-% of the total weight of the ink composition.

According to FR 2 351 706, improved efficiencies in mill operations can be achieved in wet grinding of coal or ore containing metal values by carrying out the grinding process in the presence of a chemical grinding aid. An increase in the rate of ore-particle breakage obtained by use of the grinding aid allows higher ore-slurry densities to be ground without an accompanying decrease in grinding kinetics. This permits either a greater throughput of ground slurry per unit of time or, therefore, a lower energy consumption per ton of ground ore and/or an increase in the fineness of ground slurry at a constant throughput.

U.S. Pat. No. 3,923,717 discloses superior reduction of the water demand of wet process Portland cement slurries by water-soluble salts of styrene-maleic anhydride co-polymers having a molecular weight range of from about 1'000 to about 5'000 g/mol.

In WO 2013/039986, mineral compositions and related methods are disclosed. A mineral composition may include a mineral treated with a styrene-based polymer. The mineral treated with a styrene-based polymer may be used for a coating on a paper product having a first Cobb value that is less than a second Cobb value of the paper product with the coating devoid of the mineral composition.

Several further attempts have been made to improve the applicability of particulate mineral materials and especially calcium carbonate-containing mineral fillers, e.g., by treating such materials with higher aliphatic carboxylic acids, which in some cases may also be referred to as fatty acids, and aliphatic carboxylic acid salts. For instance, WO 00/20336 relates to an ultrafine natural calcium carbonate which may optionally be treated with one or more several fatty acids or one or more several salts, or mixtures thereof, and which is used as a rheology regulator for polymer compositions.

Likewise, U.S. Pat. No. 4,407,986 relates to a precipitated calcium carbonate that is surface-treated with a dispersant that may include higher aliphatic acids and their metal salts in order to limit the addition of lubricant additives when kneading this calcium carbonate with crystalline polypropylene and to avoid the formation of calcium carbonate aggregates that limit the impact strength of the polypropylene.

In EP 0 325 114 relating to non-sagging underseal compositions for motor vehicles based on polyvinyl chloride which has improved rheological and adhesion properties, a mixture of an ammonium salt of 12-hydroxystearic acid in combination with a fatty acid (in a weight ratio of 1:1) is used to treat a mineral filler.

Moreover, particulate mineral materials may also be treated with other surface-treatment agents, such as silanes, siloxanes, phosphates, phosphonates, oxalates, succinates, fluorides, natural or synthetic polymers, or mixtures thereof in order to hydrophobize the surface of said mineral material.

However, in many cases, the preparation of calcium carbonate-containing mineral filler products by use of the aforementioned grinding agents and dispersants leads to a poor quality. For example, the use of grinding agents often results in a high water pick up susceptibility of the resulting mineral filler product. Particulate calcium carbonate-containing materials having high moisture pick up susceptibilities may especially be disadvantageous when used as filler in polymer compositions. For example, such materials may pick up moisture during storage, transportation, and/or processing which, in turn, may lead to the formation of voids in polymer compositions produced in a melt extrusion process.

In this respect, EP 0 998 522 describes suspensions being wet ground in the absence of dispersant or in presence of only sub-efficient amounts, which are then dried and used as a filler in polymer products. As a general rule, the prior art teaches to use neither any dispersant nor grinding agent for the grinding of calcium carbonate if intended for the use as a filler in polymer products.

In view of the foregoing, the expert is still faced with the problem of efficient production of wet ground dried fillers for the application in plastics, such as polyolefins, without a decrease in quality. Still today, wet grinding processes have several disadvantages. For example, the absence of grinding agents and dispersants requires grinding at low solids content which results in a reduced throughput and an overall increase in grinding energy. Moreover, the drying of low solids filler suspensions also results in higher energy consumption.

There is still a need to provide mineral filler products and processes for their preparation which may reduce or avoid one or more of the aforementioned technical drawbacks.

It is thus an object of the present invention to provide a process for the preparation of a mineral filler product which may be carried out at high solids content. Another object may also be seen in the provision of a highly efficient process for the provision of a mineral filler product having a relatively low moisture pick up susceptibility.

One or more of the foregoing and other problems are solved by the subject-matter as defined herein in the independent claims.

A first aspect of the present invention relates to a process for the preparation of a mineral filler product, said process comprising the steps of:
  a) providing a calcium carbonate-containing material;
  b) providing water;
  c) providing at least one grinding agent;
  d) wet grinding the calcium carbonate-containing material in a mixture obtained by contacting:
    i) the calcium carbonate-containing material provided in step a), with
    ii) the water provided in step b), and with
    iii) the at least one grinding agent provided in step c) in any order in at least one grinding unit to obtain a wet ground mineral filler;
  e) optionally classifying the wet ground mineral filler of step d) to obtain a coarse fraction and a fine fraction, wherein the coarse fraction is removed or subjected to wet grinding step d) and the fine fraction represents a fine mineral filler;
  f) drying the wet ground mineral filler of step d) and/or the fine mineral filler of step e) to obtain a dried mineral filler having a total moisture content of less than or equal to 1.0 wt.-%, based on the total weight of said dried mineral filler; and
  g) treating the dried mineral filler of step 0 with a hydrophobizing agent to obtain a surface-treated product having a treatment layer on at least part of the surface of said product;
  wherein the total moisture content in the mixture of step d) ranges from 15.0 to 50.0 wt.-%, based on the total weight of said mixture;
  the amount of the at least one grinding agent provided in step c) ranges from 0.01 to 10.0 wt.-%, based on the total dry weight of the calcium carbonate-containing material;
  the temperature in step d) ranges from 60° C. to 150° C.; and
  the at least one grinding agent is selected from the group consisting of styrene-maleic anhydride co-polymers and derivatives of styrene-maleic anhydride co-polymers, said derivatives being selected from styrene-maleic anhydride co-polymers having partially or fully hydrolyzed maleic anhydride units, wherein said grinding agent has a monomer unit ratio (styrene units : maleic anhydride units, S:MA) of from 1:2 to 5:1 and a molecular weight $M_W$ of from 500 to 40'000 g/mol.

According to the process of the present invention, the mineral filler product can be prepared from a calcium carbonate-containing material, for example from marble, limestone, chalk, dolomite, and the like, in a wet grinding process. The present invention makes use of at least one grinding agent selected from the group of styrene-maleic anhydride co-polymers and derivatives of styrene-maleic anhydride co-polymers instead of conventional agents, such as polyacrylates. For this purpose, a mixture obtained by contacting calcium carbonate-containing material and water is provided and subjected to a wet grinding step in a grinding unit (e.g., a ball mill) at elevated temperatures ranging from 60° C. to 150° C. The grinding agent may be added to said mixture prior to the grinding step or during wet grinding of the calcium carbonate-containing material. The grinding agent may even be added prior to the addition of water. Upon addition of the grinding agent and during the grinding step, a layer may be formed on at least part of the surface of the wet ground mineral filler. Said layer may comprise the styrene-maleic anhydride co-polymers or derivatives of styrene-maleic anhydride co-polymers. It may also comprise the corresponding reaction products of the grinding agent(s) which may result from the reaction of said agent(s), for example, with the calcium carbonate-containing material present in the mixture of step d). Typically, said reaction products are reaction products resulting from the reaction of the grinding agent(s) with the surface of the calcium carbonate-containing material. Subsequently to the grinding step, the wet ground mineral filler is dried to remove at least part of the moisture (i.e. water) of the grinding mixture to obtain a dried mineral filler having a moisture content of less than 1.0 wt.-%. An optional classifying step may be carried out prior to the aforementioned drying step. The dried mineral filler is then subjected to a treatment step by using a hydrophobizing agent to obtain a surface-treated mineral filler product providing a treatment layer on at least part of the surface of said mineral filler product. In order to achieve optimal grinding efficiency and optimal quality of the obtainable mineral filler product, the at least one grinding agent has a monomer unit ratio (styrene units: maleic anhydride units, S:MA) of from 1:2 to 5:1 and a molecular weight $M_W$ of from 500 to 40'000 g/mol.

Another aspect of the present invention relates to a mineral filler product. Said product is obtainable by the process according to the present invention.

Still another aspect of the present invention relates to the use of the inventive mineral filler product in a polymer composition, in paper making, paper coatings, agricultural applications, paints, adhesives, sealants, construction applications, and/or cosmetic applications.

Advantageous embodiments of the process according to the present invention and embodiments of the mineral filler product obtainable by the process according to the present invention are defined in the corresponding subclaims.

According to one embodiment, the calcium carbonate-containing material provided in step a) is selected from natural calcium carbonate sources and preferably is selected from the group consisting of marble, limestone, chalk, dolomite, and mixtures thereof.

According to another embodiment, the at least one grinding agent provided in step c) has a monomer unit ratio (S:MA) of from 1:1 to 4:1, preferably from 1:1 to 3:1, and more preferably from 1:1 to 2:1.

According to another embodiment, the at least one grinding agent provided in step c) has a molecular weight $M_W$ of from 2'000 to 30'000 g/mol and preferably from 4'000 to 8'000 g/mol.

According to still another embodiment, the at least one grinding agent provided in step c) is partially or fully neutralized with cations selected from lithium, sodium, potassium, calcium, magnesium, ammonium, iminium, and mixtures thereof According to still another embodiment, the total moisture content in the mixture of step d) ranges from 18.0 to 35.0 wt.-%, preferably from 20.0 to 28.0 wt.-%, and more preferably from 22.0 to 25.0 wt.-%, based on the total weight of said mixture.

According to one embodiment, the temperature in step d) ranges from 65° C. to 125° C., preferably from 70° C. to 115° C., and more preferably from 75° C. to 105° C.

According to another embodiment, the wet ground mineral filler of step d) has a weight median particle $d_{50}$ ranging from 0.1 to 8.0 µm, preferably from 0.2 to 5.0 µm, and more preferably from 0.4 to 3.0 µm.

According to another embodiment, the dried mineral filler of step 0 has a total moisture content of less than or equal to 0.5 wt.-%, preferably less than or equal to 0.2 wt.-%, and more preferably between 0.03 and 0.07 wt.-%, based on the total weight of said dried mineral filler.

According to still another embodiment, the hydrophobizing agent of step g) is selected from the group consisting of fatty acids having from 6 to 24 chain carbon atoms, monosubstituted succinic anhydrides, alkyl phosphoric acid esters, polyhydrogensiloxane, polydimethylsiloxane, and mixtures thereof.

According to one embodiment, the mineral filler product has a normalized moisture pick up susceptibility of less than or equal to 0.18 mg/m², preferably less than or equal to 0.17 mg/m², more preferably less than or equal to 0.16 mg/m², and most preferably from 0.10 to 0.15 mg/m².

According to another embodiment, the mineral filler product has a volatile onset temperature of at least or equal to 200° C., preferably at least or equal to 230° C., and more preferably at least or equal to 250° C.

According to still another embodiment, the mineral filler product is used in a polymer composition, said polymer composition comprising:
a) at least one polymeric resin; and
b) from 0.1 to 90.0 wt.-%, preferably from 1.0 to 85.0 wt.-%, and more preferably from 2.0 to 45.0 wt.-%, based on the total weight of said polymer composition, of the mineral filler product obtainable by the process according to the present invention.

It should be understood that for the purposes of the present invention, the following terms have the following meanings:

The term "filler" in the meaning of the present invention refers to substances which may be added to materials, such as polymers, elastomers, paints, or adhesives, e.g. to lower the consumption of more expensive materials or to improve material or mechanical properties of the resulting products. The person skilled in the art very well knows the fillers, typically mineral fillers, used in the respective field.

The term "wet ground" or "wet grinding" in the meaning of the present invention refers to the comminution of a solid material being present in form of a slurry or suspension by using a mill (e.g., a ball mill).

The terms "coarse" and "fine" as used herein describe the particle size of two fractions of a particulate material relative to each other and, thus, do not imply a specific particle size or size range. Unless indicated otherwise, both terms refer to the relative weight median particle sizes $d_{50}$. In this respect, the term "fine fraction" indicates that the weight median particle size $d_{50}$ of said fraction is smaller than the weight median particle size $d_{50}$ of the corresponding "coarse fraction".

Unless specified otherwise, the terms "drying" refers to a process according to which at least a portion of water is removed from a material to be dried such that a constant weight of the obtained "dried" material at 120° C. is reached. Moreover, a "dried" material may be further defined by its total moisture content which, unless specified otherwise, is less than or equal to 1.0 wt.-%, preferably less than or equal to 0.5 wt.-%, more preferably less than or equal to 0.2 wt.-%, and most preferably between 0.03 and 0.07 wt.-%, based on the total weight of the dried material.

The "total moisture content" of a material refers to the percentage of moisture (i.e. water) which may be desorbed from a sample upon heating to 220° C.

A "natural calcium carbonate source" may be any natural material comprising calcium carbonate. Such materials comprise, for example, marble, limestone, chalk, dolomite, and the like.

The "moisture pick up susceptibility" of a material refers to the amount of moisture absorbed on the surface of said material within a certain time upon exposure to a defined humid atmosphere and is expressed in mg/g. The "normalized moisture pick up susceptibility" of a material refers to the amount of moisture absorbed on the surface of said material within a certain time upon exposure to a defined humid atmosphere and is expressed in mg/m².

The term "volatile onset temperature" in the meaning of the present application refers to a temperature at which volatiles—including volatiles introduced as a result of the present process—begin to evolve, as observed on a thermogravimetric (TGA) curve, plotting the mass of remaining sample (y-axis) as a function of temperature (x-axis), the preparation and interpretation of such a curve being defined hereafter in the experimental part.

Throughout the present application, the particle size of a fraction of a particulate material is described by its particle size distribution. The value $d_x$ represents the diameter relative to which x% by weight of the particles have diameters less than $d_x$. This means, for example, that the $d_{98}$ value (also referred to as the "topcut") is the particle size at which 98 wt.-% of all particles of a fraction are smaller than the indicated value. The $d_{50}$ value is thus the "weight median particle size" at which 50 wt.-% of all particles are smaller than the indicated particle size.

Unless stated otherwise, the "molecular weight" or "$M_w$" of a polymer as used herein refers to the weight average molecular weight as measured according to the method described hereinafter.

Where an indefinite or definite article is used when referring to a singular noun, e.g., "a", "an" or "the", this includes a plural of that noun unless anything else is specifically stated.

Where the term "comprising" is used in the present description and claims, it does not exclude other elements. For the purposes of the present invention, the term "consisting of" is considered to be a preferred embodiment of the term "comprising". If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This, e.g., means that, unless the context clearly dictates otherwise, the term "obtained" does not mean to indicate that, e.g., an embodiment must be obtained by, e.g., the sequence of steps following the term "obtained" though such a limited understanding is always included by the terms "obtained" or "defined" as a preferred embodiment.

According to the process of the present invention, a mineral filler product may be prepared from a calcium carbonate-containing material. Said process comprises a wet grinding step which is carried out in the presence of at least one grinding agent selected from styrene-maleic anhydride co-polymers and derivatives of styrene-maleic anhydride co-polymers. The presence of said at least one grinding agent during wet grinding leads to a wet ground mineral filler which may provide a layer on at least a part of the surface of the wet ground mineral filler, wherein said layer may comprise said at least one grinding agent. As will be discussed herein later in more detail, the presence of said at least one grinding agent during the wet grinding step may also lead to the formation of reaction products resulting from the reaction of the calcium carbonate-containing material provided in step a) and/or the water provided in step b) with said at least one grinding agent provided in step c). Said reaction product may also form part of the layer being present on at least a part of the surface of the wet ground mineral filler.

The inventors surprisingly found that the mineral filler product obtainable by the process according to the present invention provides several advantages. For example, the at least one styrene-maleic anhydride co-polymer and/or at least one derivative of a styrene-maleic anhydride co-polymer may be used as a substitute for conventional grinding agents, such as polyacrylates. The use of at least one styrene-maleic anhydride co-polymer and/or at least one derivative of a styrene-maleic anhydride co-polymer as grinding agents leads to a mineral filler product being less hydrophilic (i.e. more hydrophobic) as compared to, for example, polyacrylate-dispersed materials.

The problems described hereinabove with respect to the prior art may be solved by the process according to the present invention using efficient amounts of specific styrene-maleic anhydride co-polymers or derivatives thereof. The solids content during grinding may thereby be increased, leading to higher mill capacities and higher throughput. In turn, lower investments and smaller plant footprints for equal production capacities are required.

As reported earlier, the problem of a high water pick up has been addressed in the prior art by wet grinding at low solids content with no or only a reduced amount of grinding agent or dispersant. The present invention provides a solution which allows producing slurries at high solids content where only a reduced amount of water needs to be evaporated after grinding in order to obtain a dry mineral filler product. Said product has a lower water pick up susceptibility as compared to mineral filler products prepared by using conventional grinding agents.

In the following, preferred embodiments of the process according to the present invention for the preparation of a mineral filler product will be discussed in more detail. It is to be understood that these details and embodiments also apply to the mineral filler product itself as well as to the use of said product in any of the disclosed applications.

Process Step a)

According to step a) of the process of the present invention, a calcium carbonate-containing material is provided. In general, said calcium carbonate-containing material may be any calcium carbonate source and may be of natural or synthetic origin.

In some embodiments of the process according to the present invention, the calcium carbonate-containing material provided in step a) is selected from natural calcium carbonate sources, preferably containing from 50 to 98 wt.-% of calcium carbonate, based on the total weight of said calcium carbonate-containing material.

According to one embodiment, the calcium carbonate-containing material contains at least 50 wt.-%, preferably at least 70 wt.-%, more preferably at least 80 wt.-%, even more preferably at least 90 wt.-%, and most preferably from 90 to 98 wt.-% of calcium carbonate, based on the total weight of said calcium carbonate-containing material.

According to another embodiment, the calcium carbonate-containing material provided in step a) is selected from the group consisting of marble, limestone, chalk, dolomite, and mixtures thereof.

According to a preferred embodiment, the calcium carbonate-containing material provided in step a) is selected from the group consisting of marble, limestone, chalk, and mixtures thereof.

In cases where the calcium carbonate is of synthetic origin, the calcium carbonate-containing may be precipitated calcium carbonate (PCC). A PCC in the meaning of the present invention is a synthesized material, generally obtained by precipitation following a reaction of carbon dioxide and calcium hydroxide (hydrated lime) in an aqueous environment or by precipitation of a calcium- and a carbonate source in water. Additionally, precipitated calcium carbonate can also be the product of introducing calcium and carbonate salts, calcium chloride and sodium carbonate, for example, in an aqueous environment. PCC may be vaterite, calcite or aragonite. PCCs are described, for example, in EP 2 447 213, EP 2 524 898, EP 2 371 766, or unpublished European patent application No. 12 164 041.1.

Suitably, the calcium carbonate-containing material of step a) is provided as a solid material being in particulate form. In this respect, the calcium carbonate-containing material provided in step a) may have any particle size distribution allowing the material to be subjected to a wet grinding step. Therefore, the calcium carbonate-containing material may be provided as a comminuted material, for example, in crushed or preground form.

According to one embodiment, the calcium carbonate-containing material provided in step a) has a weight median particle size $d_{50}$ ranging from 0.1 to 600.0 μm, preferably from 0.2 to 200.0 μm, and more preferably from 0.5 to 100.0 μm.

Process Step b)

For the purpose of the present invention, any type of water may used in order to prepare the mixture to be wet ground in grinding step d).

According to one embodiment the water may be tap water, deionized water, or a mixture thereof. Preferably, the water provided in step b) is tap water.

Process Step c)

According to step c) of the process of the present invention, at least one grinding agent is provided. A "grinding agent" in the meaning of the present invention may be any compound which may be added prior to and/or during a grinding step (e.g., wet grinding) in order to enhance the grinding performance.

The inventors surprisingly found that it is of particular advantage to use at least one grinding agent selected from the group consisting of styrene-maleic anhydride co-polymers and derivatives of styrene-maleic anhydride co-polymers, said derivatives being selected from styrene-maleic anhydride co-polymers having partially or fully hydrolyzed maleic anhydride units, wherein said grinding agent has a monomer unit ratio (styrene units:maleic anhydride units, S:MA) of from 1:2 to 5:1 and a molecular weight $M_W$ of from 500 to 40'000 g/mol.

For the purpose of the present invention, styrene-maleic anhydride co-polymers (SMAs) may be defined by their "monomer unit ratio" of the polymer chain, i.e. by the monomer unit ratio (S:MA) of styrene units (S) to maleic anhydride (MA) units.

Unless indicated otherwise, the ratio (S:MA) is used likewise to define the monomer unit ratio of:
derivatives of styrene-maleic anhydride co-polymers (SMA derivatives);
reaction products of styrene-maleic anhydride co-polymers (reaction products of SMAs); and
reaction products of derivates of styrene-maleic anhydride co-polymers (reaction products of SMA derivatives).

Said reaction products typically result from the reaction of the calcium carbonate-containing material provided in step a) and/or the water provided in step b) with said at least one grinding agent provided in step c).

As will become more apparent from the embodiments herein below, the monomer unit ratio (S:MA) thus, on the one hand, includes styrene units, modified styrene units (present in SMA derivatives) and reaction products of both and, on the other hand, includes maleic anhydride units, modified maleic anhydride units (present in SMA derivatives) and reaction products of both.

Styrene-maleic anhydride co-polymers in the meaning of the present invention may be any polymers obtainable by co-polymerizing styrene and maleic anhydride, e.g., linear or branched random co-polymers, linear or branched block co-polymers, or a mixture thereof.

Therefore, according to one embodiment, the at least one grinding agent is selected from virgin styrene-maleic anhydride co-polymers, i.e. from unmodified styrene-maleic anhydride co-polymers (in the art also referred to as SMA or SMAnh).

According to a preferred embodiment, the at least one grinding agent is selected from derivatives of styrene-maleic anhydride co-polymers (SMA derivatives), preferably said at least one grinding agent is selected from derivatives of styrene-maleic anhydride co-polymers having partially or fully hydrolyzed maleic anhydride units.

Derivatives of styrene-maleic anhydride co-polymers (SMA derivatives) may be any polymers obtainable by:
a) co-polymerizing styrene and maleic anhydride to obtain co-polymers and further subjecting said co-polymers to a modification step; or
b) co-polymerizing a mixture comprising a styrene monomer and a maleic anhydride monomer to obtain co-polymers, wherein at least a part of one or both of the two monomers is a modified monomer and, optionally, subjecting said co-polymers to a modification step.

In a preferred embodiment, SMA derivatives may be any polymers obtainable by co-polymerizing styrene and maleic anhydride to obtain co-polymers and further subjecting said co-polymers to a modification step.

Said modification of the co-polymers typically leads to a partial or full modification of the styrene-maleic anhydride co-polymers, i.e. to styrene-maleic anhydride co-polymers having partially or fully modified monomer units. Accordingly, the derivatives of styrene-maleic anhydride co-polymers in the meaning of the present invention may have partially or fully modified styrene units and/or partially or fully modified maleic anhydride units, preferably partially modified styrene units and/or partially modified maleic anhydride units, and more preferably fully modified styrene units and/or fully modified maleic anhydride units.

Unless dictated otherwise, the term "partially modified" as used herein indicates that SMA derivatives still comprise unmodified monomer unit(s), e.g., unmodified styrene units or unmodified maleic anhydride units. In contrast thereto, the term "fully modified" indicates that any monomer unit present in an SMA derivative is modified, e.g., any styrene unit or any maleic anhydride unit. The same meaning also applies to more specific modifications: In this respect, the term "partially hydrolyzed maleic anhydride units", for example, means that a derivative of a styrene-maleic anhydride co-polymer may still comprise non-hydrolyzed maleic anhydride units, whereas the term "fully hydrolyzed maleic anhydride units" means that all maleic anhydride units of the SMA derivative are in a hydrolyzed form.

According to one embodiment, the derivatives of styrene-maleic anhydride co-polymers are selected from styrene-maleic anhydride co-polymers having partially or fully modified maleic anhydride units, preferably having partially modified maleic anhydride units, and more preferably having fully modified maleic anhydride units.

According to another embodiment, the derivatives of styrene-maleic anhydride co-polymers are selected from styrene-maleic anhydride co-polymers obtainable by co-polymerizing styrene and maleic anhydride to obtain co-polymers and further subjecting said co-polymers to a modification step, said derivatives having partially or fully modified maleic anhydride units, preferably having partially modified maleic anhydride units, and more preferably having fully modified maleic anhydride units.

According to a preferred embodiment, the modification step comprises the reaction with metal hydroxides, preferably alkali metal hydroxides, and more preferably sodium hydroxide, potassium hydroxide, and mixtures thereof.

Therefore, the derivatives of styrene-maleic anhydride co-polymers may be selected from styrene-maleic anhydride co-polymers obtainable by co-polymerizing styrene and maleic anhydride to obtain co-polymers and further subjecting said co-polymers to a modification step comprising the reaction with metal hydroxides, said derivatives having partially or fully modified maleic anhydride units, preferably having partially modified maleic anhydride units, and more preferably having fully modified maleic anhydride units.

According to another embodiment, the derivatives of styrene-maleic anhydride co-polymers are selected from styrene-maleic anhydride co-polymers obtainable by co-polymerizing styrene and maleic anhydride to obtain co-polymers and further subjecting said co-polymers to a modification step comprising the reaction with alkali metal hydroxides, said derivatives having partially or fully modified maleic anhydride units, preferably having partially modified maleic anhydride units, and more preferably having fully modified maleic anhydride units.

According to another embodiment, the derivatives of styrene-maleic anhydride co-polymers are selected from styrene-maleic anhydride co-polymers obtainable by co-polymerizing styrene and maleic anhydride to obtain co-polymers and further subjecting said co-polymers to a modification step comprising the reaction with sodium hydroxide, potassium hydroxide, and mixtures thereof, said derivatives having partially or fully modified maleic anhydride units, preferably having partially modified maleic anhydride units, and more preferably having fully modified maleic anhydride units.

As disclosed hereinabove, the derivatives of styrene-maleic anhydride co-polymers may be styrene-maleic anhydride co-polymers having partially or fully modified styrene units and/or partially or fully modified maleic anhydride units, and preferably said SMA derivatives may be styrene-maleic anhydride co-polymers having partially or fully modified maleic anhydride units. The term "modified" as used herein indicates that a polymer comprises monomer units which may be obtainable from modifications steps, for example, by the formation of hydrolysates (e.g., hydrolyzed maleic anhydride units), esters (e.g., esterified maleic anhydride units), amides (e.g., amidized maleic anhydride units), and imides (e.g., imidized maleic anhydride units).

In this respect, styrene-maleic anhydride co-polymers having hydrolyzed maleic anhydride units, for example, may comprise carboxyl groups [—C(=O)OH] and/or carboxylate groups [—C(=O)O$^-$]. Accordingly, styrene-maleic anhydride co-polymers having esterified maleic anhydride units may comprise ester groups [—C(=O)OR] resulting from a modification step using alcohols, such as methanol, ethanol, and the like, whereas styrene-maleic anhydride co-polymers having amidized maleic anhydride units may comprise amide moieties [—C(=O)NHR] resulting from a modification step using amines, such as ammonia, primary amines (e.g., methylamine, dimethylaminopropylamine), and secondary amines (e.g., dimethylamine). Imide moieties [—C(=O)NHC(=O)—] as present in styrene-maleic anhydride co-polymers having imidized maleic anhydride units may also result from modifications using amines such as ammonia or primary amines (e.g., methylamine, dimethylaminopropylamine) but, however, require a nucleophilic substitution with a single amine moiety on both carbonyl groups of the maleic anhydride unit.

In general, a modification of the maleic anhydride unit—from a chemical point of view—may comprise at least one modification at the first carbonyl group and, alternatively, another nucleophilic substitution at the second carbonyl group of the maleic anhydride unit. In particular, this applies to styrene-maleic anhydride co-polymers having partially or fully esterified maleic anhydride units as well as to styrene-maleic anhydride co-polymers having partially or fully amidized maleic anhydride units which thus may comprise mono- and/or diester units (i.e. "monoesterified" and/or "diesterified" maleic anhydride units) as well as mono- and diamide monomer units (i.e. "monoamidized" and/or "diamidized" maleic anhydride units).

If not indicated otherwise, the terms "esterified maleic anhydride units" and "amidized maleic anhydride units" encompasses both mono- and dimodified maleic anhydride units.

As already outlined above, imidized styrene-maleic anhydride co-polymers are formed by a substitution at both carbonyl groups of a maleic anhydride unit which, in turn, renders a further specification redundant. In case of hydrolytic modifications, e.g., in a modification step using a metal hydroxide, a dicarboxylic acid or dicarboxylate unit is already obtained after nucleophilic substitution at the first carbonyl group. Consequently the term "hydrolyzed" implies the presence of two carboxylic groups [—C(=O)OH or —C(=O)O$^-$ or both] and does also not require any specification whether the maleic anhydride group is monohydrolyzed or dihydrolyzed.

According to one embodiment, the derivatives of styrene-maleic anhydride co-polymers are selected from styrene-maleic anhydride co-polymers having partially hydrolyzed maleic anhydride units, and preferably having fully hydrolyzed maleic anhydride units.

According to another embodiment of the present invention, the derivatives of styrene-maleic anhydride co-polymers may be partially or fully neutralized with mono- or divalent cations selected from lithium, sodium, potassium, calcium, magnesium, ammonium, iminium, and mixtures thereof, meaning that protons present in the derivatives of styrene-maleic anhydride co-polymers may be partially or fully replaced by any of the aforementioned cations. Said neutralization may be achieved, for example, by adjustment to a specific pH value using reagents such as metal hydroxides (e.g., sodium hydroxide, potassium hydroxide), amines (e.g., ammonia, polyethylenimine), or imines. Typical protons that may be replaced are those found in carboxylic acids [—C(=O)OH], sulfonic acids [—S(=O)$_2$OH], and/or imides [—C(=O)NHC(=O)—]. The skilled person knows how to partially or fully replace protons by mono- or divalent cations and also knows how to determine whether a derivative is partially or fully neutralized.

However, in cases where the derivatives of styrene-maleic anhydride co-polymers comprise basic groups (e.g., amines), the derivatives of a styrene-maleic anhydride co-polymers may also be neutralized by the addition of C1-C10 carboxylic acids (e.g., acetic acid), mineral acids (e.g., hydrochloric acid, phosphoric acid, or sulfuric acid), and mixtures thereof.

Accordingly, the derivatives of styrene-maleic anhydride co-polymers may be selected from styrene-maleic anhydride co-polymers having partially or fully modified styrene units and/or partially or fully modified maleic anhydride units, wherein said derivatives are partially or fully neutralized with mono- or divalent cations selected from lithium, sodium, potassium, calcium, magnesium, ammonium, iminium, and mixtures thereof.

According to another embodiment, the derivatives of styrene-maleic anhydride co-polymers are selected from styrene-maleic anhydride co-polymers having partially hydrolyzed maleic anhydride units, and preferably having fully hydrolyzed maleic anhydride units, wherein said derivatives are partially or fully neutralized with mono- or divalent cations selected from lithium, sodium, potassium, calcium, magnesium, ammonium, iminium, and mixtures thereof.

According to still another embodiment of the present invention, the derivatives of styrene-maleic anhydride co-polymers further comprise partially or fully modified styrene units, preferably the partially or fully modified styrene units are fully or partially sulfonated styrene units, more preferably the partially or fully modified styrene units are partially sulfonated styrene units, and most preferably the partially or fully modified styrene units are fully sulfonated styrene units.

According to a preferred embodiment, the derivatives of styrene-maleic anhydride co-polymers are selected from styrene-maleic anhydride co-polymers having maleic anhydride units being partially or fully hydrolyzed and/or styrene units being partially or fully sulfonated, wherein said derivatives of styrene-maleic anhydride co-polymers are partially or fully neutralized with mono- or divalent cations selected from lithium, sodium, potassium, calcium, magnesium, ammonium, iminium, and mixtures thereof.

According to a preferred embodiment, the derivatives of styrene-maleic anhydride co-polymers are selected from styrene-maleic anhydride co-polymers having maleic anhydride units being partially hydrolyzed and/or styrene units being partially or fully sulfonated, wherein said derivatives of styrene-maleic anhydride co-polymers are partially or fully neutralized with mono- or divalent cations selected from lithium, sodium, potassium, calcium, magnesium, ammonium, iminium, and mixtures thereof.

According to another preferred embodiment, the derivatives of styrene-maleic anhydride co-polymers are selected from styrene-maleic anhydride co-polymers having maleic anhydride units being fully hydrolyzed and/or styrene units being partially or fully sulfonated, wherein said derivatives of styrene-maleic anhydride co-polymers are fully neutralized with mono- or divalent cations selected from lithium, sodium, potassium, calcium, magnesium, ammonium, iminium, and mixtures thereof.

The styrene-maleic anhydride co-polymers having partially or fully esterified (mono- and/or diesterified) maleic anhydride units and/or partially or fully amidized (mono- and/or diamidized) maleic anhydride units and/or partially or fully imidized maleic anhydride units, may be substituted with linear, branched, aliphatic, cyclic, saturated and unsaturated organyl groups, preferably said organyl groups have a total amount of carbon atoms from C1 to C10, more preferably from C1 to C5, and most preferably from C1 to C3.

For the purposes of the present invention, the at least one grinding agent (i.e. both the styrene-maleic anhydride co-polymers and derivatives of styrene-maleic anhydride co-polymers) provided in step c) may have a monomer unit ratio (styrene units: maleic anhydride units, S:MA) of from 1:2 to 5:1.

According to one embodiment, the at least one grinding agent provided in step c) has a monomer unit ratio (S:MA) of from 1:1 to 4:1, preferably from 1:1 to 3:1, and more preferably from 1:1 to 2:1.

Additionally or alternatively, the at least one grinding agent may also be defined by its molecular weight $M_W$ which may be in the range from 500 to 40'000 g/mol.

According to another embodiment, the at least one grinding agent provided in step c) has a molecular weight $M_W$ of from 1'000 to 40'000 g/mol, preferably from 1'000 to 15'000 g/mol, more preferably from 2'000 to 30'000 g/mol, and most preferably from 4'000 to 8'000 g/mol.

According to still another embodiment, the at least one grinding agent provided in step c) has a molecular weight $M_W$ of from 1'000 to 40'000 g/mol and a monomer unit ratio (S:MA) of from 1:1 to 4:1, preferably from 1:1 to 3:1, and more preferably from 1:1 to 2:1.

According to still another embodiment, the at least one grinding agent provided in step c) has a molecular weight $M_W$ of from 1'000 to 15'000 g/mol and a monomer unit ratio (S:MA) of from 1:1 to 4:1, preferably from 1:1 to 3:1, and more preferably from 1:1 to 2:1.

According to still another embodiment, the at least one grinding agent provided in step c) has a molecular weight $M_W$ of from 2'000 to 10'000 g/mol and a monomer unit ratio (S:MA) of from 1:1 to 4:1, preferably from 1:1 to 3:1, and more preferably from 1:1 to 2:1.

According to still another embodiment, the at least one grinding agent provided in step c) has a molecular weight $M_W$ of from 4'000 to 8'000 g/mol and a monomer unit ratio (S:MA) of from 1:1 to 4:1, preferably from 1:1 to 3:1, and more preferably from 1:1 to 2:1.

The at least grinding may be provided in undiluted form or in form of an aqueous solution, wherein an aqueous solution is preferred.

According to one embodiment, the at least one grinding agent provided in step c) is provided in form of an aqueous solution comprising from 5.0 to 50.0 wt.-%, preferably from 10.0 to 45.0 wt.-%, and more preferably from 20.0 to 40.0 wt.-%, based on the total weight of the solution, of said at least one grinding agent.

According to another embodiment, said aqueous solution has a pH value ranging from pH 4.0 to 12.0, preferably from pH 6.0 to 11.0, and more from pH 7.5 to 10.5.

The amount of the at least one grinding agent provided in step c) may be adjusted to the specific needs. In many cases, the amount of grinding agent may be based on the dry weight of the calcium carbonate-containing material provided in step a). According to the present invention, the amount of said at least one grinding agent provided in step c) ranges from 0.01 to 10.0 wt.-%, based on the total dry weight of the calcium carbonate-containing material. Unless specifically stated otherwise, the amount of the at least one grinding agent is to be understood as a total amount. In cases where said grinding agent is added in one portion, the indicated amount thus refers to the amount of said one portion. Accordingly, in cases where the grinding agent is added in more than one portions, the indicated amount thus refers to the total amount of said portions.

According to one embodiment, the amount of said at least one grinding agent provided in step c) ranges from 0.05 to 5.0 wt.-%, preferably from 0.1 to 3.0 wt.-%, and more preferably from 0.15 to 2.0 wt.-%, based on the total dry weight of the calcium carbonate-containing material.

According to another embodiment, the amount of said at least one grinding agent provided in step c) ranges from 0.01 to 1.0 wt.-%, preferably from 0.05 to 0.75 wt.-%, and more preferably from 0.1 to 0.5 wt.-%, based on the total dry weight of the calcium carbonate-containing material.

However, the amount of said at least one grinding agent may also be based on the specific surface area of the calcium carbonate-containing material provided in step a). In this respect, in one embodiment, the amount of said at least one grinding agent provided in step c) ranges from 0.01 to 150.0 mg/m$^2$, preferably from 0.1 to 100.0 mg/m$^2$, and most preferably from 0.2 to 50.0 mg/m$^2$, based on the specific surface area of the calcium carbonate-containing material as measured by the BET nitrogen method.

Process Step d)

According to step d) of the process according to the present invention, a mixture obtained by contacting the calcium carbonate-containing material provided in step a) with the water provided in step b) and with the at least one grinding agent provided in step c) is wet ground in at least one grinding unit to obtain a wet ground mineral filler.

Likewise, a mixture obtained by contacting the calcium carbonate-containing material provided in step a) with the at least one grinding agent provided in step c) and with the water provided in step b) is wet ground in at least one grinding unit to obtain a wet ground mineral filler.

Likewise, a mixture obtained by contacting the at least one grinding agent provided in step c) with the water provided in step b) and with the calcium carbonate-containing material provided in step a) is wet ground in at least one grinding unit to obtain a wet ground mineral filler.

The term "wet grinding" in the meaning of the process according to the present invention refers to the comminution (e.g., in a ball mill, semi-autogenous mill, or autogenous mill) of solid material (e.g., of mineral origin) in the presence of water meaning that said material is in form of an aqueous slurry or suspension.

For the purposes of the present invention, any suitable mill known in the art may be used. However, said at least one grinding unit preferably is a ball mill. It has to be noted that step d) is carried out by using at least one grinding unit, i.e. it is also possible to use a series of grinding units which may, for example, be selected from ball mills, semi-autogenous mills, or autogenous mills.

The amount of water being present in the mixture to be ground may be expressed by the total moisture content which is based on the total weight of said mixture. Typically, wet grinding processes are carried using mixtures having a total moisture content ranging from 10.0 to 90.0 wt.-%, based on the total weight of said mixture.

The process according to the present invention is characterized in that the grinding step is carried out at high solids contents, i.e. at low total moisture contents, for example at a total moisture content ranging from 15.0 to 50.0 wt.-%, based on the total weight of said mixture.

According to one embodiment, the total moisture content in the mixture of step d) ranges from 18.0 to 35.0 wt.-%, preferably from 20.0 to 28.0 wt.-%, and more preferably from 22.0 to 25.0 wt.-%, based on the total weight of the mixture.

The calcium carbonate-containing material provided in step a) and/or the water provided in step b) may undergo reactions with said at least one grinding agent provided in step c). Said reactions may occur immediately after contacting with each other at least two of the components provided in steps a) to c). Preferably said reactions may occur after contacting the calcium carbonate-containing material with said at least one grinding agent.

Said reaction products(s) may be present in the mixture of step d) but also may be present in any of the following process steps. Such reaction products(s) may be formed on the surface of the calcium carbonate-containing material which may result in one or more reaction product(s) being bound to the surface of the calcium carbonate-containing material. However, said reaction product(s) may also be present in the mixture without being bound to any other component present in said mixture of step d) or in any of the following process steps.

Therefore, in one embodiment of the process according to the present invention, the mixture of step c) may be obtained by contacting:
  i) the calcium carbonate-containing material provided in step a), with
  ii) the water provided in step b), and with
  iii) the at least one grinding agent provided in step c) in any order,
wherein at least a part of one or more of the components may be present in said mixture in form of one or more reaction products resulting from the reaction of the calcium carbonate-containing material provided in step a) and/or the water provided in step b) with said at least one grinding agent provided in step c).

According to another embodiment, said mixture of step c) comprises one or more lithium, sodium, potassium, strontium, calcium, magnesium and/or aluminum salts of the at least one grinding agent provided in step b).

According to step d) of the process according to the present invention, a mixture obtained by contacting calcium carbonate-containing material, water, and at least one grinding agent is wet ground in at least one grinding unit to obtain a wet ground mineral filler.

In this respect, it is possible to obtain the mixture to be ground in step d) of the process according to the present invention by contacting with each other the components provided in steps a) to c) in any order prior to or during grinding step d).

In addition, it is also possible to obtain said mixture by contacting the components with each other in one or more portions prior to or during grinding.

According to one embodiment, the mixture of grinding step d) is obtained prior to said grinding step by simultaneously contacting the calcium carbonate-containing material provided in step a) with the water provided in step b) and with the at least one grinding agent provided in step c).

According to another embodiment, the mixture of grinding step d) is obtained prior to said grinding step by simultaneously contacting the calcium carbonate-containing material provided in step a) with the water provided in step b) and with a first portion of the at least one grinding agent provided in step c), wherein a second portion of the at least one grinding agent is added during grinding step d).

According to still another embodiment, the mixture of grinding step d) is obtained by first contacting the calcium carbonate-containing material provided in step a) with the at least one grinding agent provided in step c), wherein said water provided in step b) is added in one or more portions prior to or during said grinding step.

In this respect, the mixture of grinding step d) may also be obtained by contacting a dry ground mineral filler comprising a calcium carbonate-containing material and at least one of grinding agent as disclosed herein above with said water provided in step b).

It has further been found by the inventors that grinding step d) is preferably carried out at elevated temperatures. For the purposes of the process according to the present invention, a temperature ranging from 60° C. to 150° C. is particularly suitable.

According to another embodiment, the temperature in step d) ranges from 65° C. to 125° C., preferably from 70° C. to 115° C., and more preferably from 75° C. to 105° C.

Process step d) involves the wet grinding of calcium carbonate-containing material in a mixture obtained by contacting water with at least one grinding agent and with at least one calcium carbonate-containing material in at least one grinding unit to obtain a wet ground mineral filler.

In one embodiment, the wet ground mineral filler obtained after grinding step d) has a weight median particle $d_{50}$ ranging from 0.1 to 8.0 μm, preferably from 0.2 to 5.0 μm, and more preferably from 0.4 to 3.0 μm.

Process Step e)

The wet ground mineral filler obtained in process step d) may optionally be subjected to a classifying step.

Therefore, in one embodiment, the process according to the present invention comprises the steps of:
  a) providing a calcium carbonate-containing material;
  b) providing water;
  c) providing at least one grinding agent;
  d) wet grinding the calcium carbonate-containing material in a mixture obtained by contacting:
    i) the calcium carbonate-containing material provided in step a), with
    ii) the water provided in step b), and with
    iii) the at least one grinding agent provided in step c) in any order in at least one grinding unit to obtain a wet ground mineral filler;
  e) classifying the wet ground mineral filler of step d) to obtain a coarse fraction and a fine fraction, wherein the coarse fraction is removed or subjected to wet grinding step d) and the fine fraction represents a fine mineral filler;

drying the wet ground mineral filler of step d) and/or the fine mineral filler of step e) to obtain a dried mineral filler having a total moisture content of less than or equal to 1.0 wt.-%, based on the total weight of said dried mineral filler; and g) treating the dried mineral filler of step f) with a hydrophobizing agent to obtain a surface-treated product having a treatment layer on at least part of the surface of said product;

wherein the total moisture content in the mixture of step d) ranges from 15.0 to 50.0 wt.-%, based on the total weight of said mixture;

the amount of the at least one grinding agent provided in step c) ranges from 0.01 to 10.0 wt.-%, based on the total dry weight of the calcium carbonate-containing material;

the temperature in step d) ranges from 60° C. to 150° C.; and the at least one grinding agent is selected from the group consisting of styrene-maleic anhydride co-polymers and derivatives of styrene-maleic anhydride co-polymers, said derivatives being selected from styrene-maleic anhydride co-polymers having partially or fully hydrolyzed maleic anhydride units, wherein said grinding agent has a monomer unit ratio (styrene units: maleic anhydride units, S:MA) of from 1:2 to 5:1 and a molecular weight $M_W$ of from 500 to 40'000 g/mol.

According to another embodiment, the process of the present invention for the preparation of a mineral filler product comprises the steps of:

a) providing a calcium carbonate-containing material;
b) providing water;
c) providing at least one grinding agent;
d) wet grinding the calcium carbonate-containing material in a mixture obtained by contacting:
  i) the calcium carbonate-containing material provided in step a), with
  ii) the water provided in step b), and with
  iii) the at least one grinding agent provided in step c) in any order in at least one grinding unit to obtain a wet ground mineral filler;
e) drying the wet ground mineral filler of step d) to obtain a dried mineral filler having a total moisture content of less than or equal to 1.0 wt.-%, based on the total weight of said dried mineral filler; and
f) treating the dried mineral filler of step e) with a hydrophobizing agent to obtain a surface-treated product having a treatment layer on at least part of the surface of said product;

wherein the total moisture content in the mixture of step d) ranges from 15.0 to 50.0 wt.-%, based on the total weight of said mixture;

the amount of the at least one grinding agent provided in step c) ranges from 0.01 to 10.0 wt.-%, based on the total dry weight of the calcium carbonate-containing material;

the temperature in step d) ranges from 60° C. to 150° C.; and the at least one grinding agent is selected from the group consisting of styrene-maleic anhydride co-polymers and derivatives of styrene-maleic anhydride co-polymers, said derivatives being selected from styrene-maleic anhydride co-polymers having partially or fully hydrolyzed maleic anhydride units, wherein said grinding agent has a monomer unit ratio (styrene units: maleic anhydride units, S:MA) of from 1:2 to 5:1 and a molecular weight $M_W$ of from 500 to 40'000 g/mol.

In the abovementioned optional classifying step, the wet ground mineral filler of step d) may be divided into at least two fractions, i.e. into a coarse fraction and a fine fraction.

A classifying step in general serves to divide a feed fraction having a certain particle size into a coarse fraction and a fine fraction each having different particle sizes. Typically, the coarse fraction has a $d_{50}$ value being higher than that of the feed fraction, whereas the fine fraction has a $d_{50}$ value being smaller than that of the feed fraction. For this purpose, screening devices as well as gravity-based devices, such as centrifuges or cyclones (e.g., hydrocyclones) and any combination of the aforementioned devices may be used.

According to one embodiment, the wet ground mineral filler of step d) is classified using a hydrocyclone.

According to another embodiment, the fine mineral filler obtained in classifying step e) has a weight median particle size $d_{50}$ ranging from 0.05 to 6.0 µm, preferably from 0.1 to 4.0 µm, and more preferably from 0.2 to 2.5 µm.

As already described above, the wet ground mineral filler of step d) is classified in step e) to obtain a coarse fraction and a fine fraction, wherein the coarse fraction is removed or subjected to wet grinding step d) and the fine fraction represents a fine mineral filler which may be used in the following process steps.

To also use the coarse fraction obtained in classifying step e), said coarse material may be recycled. Therefore, in one embodiment, the coarse fraction of step e) is subjected to wet grinding step d).

Process Step f)

The process according to the present invention further comprises drying step f). In said drying step, the wet ground mineral filler obtained in step d) is dried to obtain a dried mineral filler. In cases where the process according to the present invention also includes optional classifying step e), the fine mineral filler (i.e. the fine fraction) is dried. In the latter case, it is also possible drying a mixture of both the wet ground mineral filler obtained in step d) and the fine mineral filler of step e).

In general, the drying step according to the process according to the present invention may be carried out by any drying method known to the skilled person.

According to one embodiment, drying step f) is a spray drying step, preferably said spray drying step is carried out at a tower temperature ranging from 90° C. to 130° C. and preferably from 100° C. to 120° C.

By means of drying step f), a dried mineral filler is obtained having a low total moisture content which is less than or equal to 1.0 wt.-%, based on the total weight of said dried mineral filler.

According to another embodiment, the dried mineral filler of step f) has a total moisture content of less than or equal to 0.5 wt.-% and preferably less than or equal to 0.2 wt.-%, based on the total weight of said dried mineral filler.

According to still another embodiment, the dried mineral filler of step f) has a total moisture content of between 0.01 and 0.15 wt.-%, preferably between 0.02 and 0.10 wt.-%, and more preferably between 0.03 and 0.07 wt.-%, based on the total weight of said dried mineral filler.

Process Step g)

The process according to the present invention for the production of a mineral filler product further comprises step g) of treating the dried mineral filler obtained in drying step f) with at least one hydrophobizing agent (also referred to as "treatment step") in order to obtain the final product, i.e. a mineral filler product. By means of said treatment step, a treatment layer is formed on at least part of the surface of the obtained mineral filler product.

The hydrophobizing agent used in treatment step g) may be any agent known to the skilled person which is capable to form a hydrophobic treatment layer on at least part of the surface of a mineral filler product.

In one embodiment, the hydrophobizing agent of step g) is selected from the group consisting of fatty acids having from 6 to 24 chain carbon atoms, mono-substituted succinic anhydrides, alkyl phosphoric acid esters, polyhydrogensiloxane, polydimethylsiloxane, and mixtures thereof.

According to another embodiment, the hydrophobizing agent of step g) is a fatty acid having from 6 to 24 chain carbon atoms, preferably selected from the group consisting of stearic acid, behenic acid, palmitic acid, isostearic acid, montanic acid, capric acid, lauric acid, myristic acid, salts thereof, and mixtures thereof, and more preferably is stearic acid and/or a salt thereof.

According to a preferred embodiment, the hydrophobizing agent of step g) is a mixture containing stearic acid and palmitic acid.

According to another embodiment, the hydrophobizing agent of step g) is an alkenyl succinic anhydride.

According to still another embodiment, the hydrophobizing agent of step g) is an alkyl phosphoric acid ester.

According to still another embodiment, the hydrophobizing agent of step g) is selected from polyhydrogensiloxane, polydimethylsiloxane, and mixtures thereof In some embodiments of the process according to the present invention, the temperature in treatment step g) ranges from 70° C. to 140° C., preferably from 75° C. to 130° C., and more preferably from 80° C. to 125° C.

In some cases, the treatment step may be carried out directly at the end of the drying step. In one embodiment, drying step f) is thus carried out in a drying unit comprising a drying chamber and the hydrophobizing agent of step g) is contacted with the dried mineral filler by direct injection of said agent into the drying chamber.

Also the final mineral filler product obtained after treatment step g) has a low total moisture content.

Therefore, according to one embodiment, said mineral filler product has a total moisture content of less than or equal to 1.0 wt.-%, preferably less than or equal to 0.5 wt.-%, and more preferably less than or equal to 0.2 wt.-% , based on the total weight of said product.

According to still another embodiment, the mineral filler product has a total moisture content of between 0.01 and 0.15 wt.-%, preferably between 0.02 and 0.10 wt.-%, and more preferably between 0.03 and 0.07 wt.-%, based on the total weight of said product.

The Mineral Filler Product

The inventors surprisingly found that according to the process according to the present invention, a mineral filler product is obtainable in a wet grinding process even at high solids content, wherein the moisture pick up susceptibility of the final product is low as compared to conventional methods operating at high solids content.

As already described above, the moisture pick up susceptibility of a material refers to the amount of moisture absorbed on the surface of said material and is expressed in mg moisture/g absorbed on a sample upon exposure to a defined humid atmosphere.

In this respect, the mineral filler product according to the present invention may have a moisture pick up susceptibility of less than or equal to 3.0 mg/g, preferably of less than or equal to 2.5 mg/g, and most preferably less than or equal to 2.0 mg/g.

In another embodiment, the mineral filler product has a moisture pick up susceptibility of less than or equal to 1.5 mg/g, preferably less than or equal to 1.0 mg/g, more preferably less than or equal to 0.8 mg/g, and most preferably less than or equal to 0.6 mg/g.

In another embodiment, the mineral filler product has a moisture pick up susceptibility of from 0.1 to 1.5 mg/g, preferably from 0.2 to 0.8 mg/g, and most preferably from 0.2 to 0.6 mg/g.

In some particular cases as, for example in case of high specific surface areas of the mineral filler product, the moisture pick up susceptibility is suitably defined based on the specific surface area of said product (referred to as the normalized moisture pick up susceptibility).

According to one embodiment, said mineral filler product has a normalized moisture pick up susceptibility of less than or equal to 0.18 mg/m$^2$, preferably less than or equal to 0.17 mg/m$^2$, more preferably less than or equal to 0.16 mg/m$^2$, and most preferably less than or equal to 0.15 mg/m$^2$, based on the specific surface area of said product as measured by the BET nitrogen method.

According to one embodiment, said mineral filler product has a normalized moisture pick up susceptibility of from 0.10 to 0.18 mg/m$^2$, preferably from 0.11 to 0.17 mg/m$^2$, and most preferably from 0.12 to 0.16 mg/m$^2$, based on the specific surface area of said product as measured by the BET nitrogen method.

According to another embodiment, said mineral filler product has a specific surface area ranging from 0.1 to 20.0 m$^2$/g and more preferably from 3.0 to 14.0 m$^2$/g as measured by the BET nitrogen method.

By means of the process according to the present invention, a low total volatiles content and, in particular, a high volatile onset temperature may be achieved.

In one embodiment, the mineral filler product according to the present invention may have a volatile onset temperature of at least or equal to 200° C., preferably at least or equal to 230° C., and more preferably at least or equal to 250° C.

The inventive mineral filler product may be used in a polymer composition, in paper making, paper coatings, agricultural applications, paints, adhesives, sealants, construction applications, and/or cosmetic applications, preferably said mineral filler product is used in a polymer composition.

As the mineral filler product has a low moisture pick up susceptibility, it may advantageously be used in paper coatings in order to adjust the printing properties of a coated paper. Furthermore, the mineral filler product may also be used in exterior paints and bathroom paints which may lead to a reduction in mildew growth on surfaces being treated with such paints.

The use of the mineral filler product according to the present invention as a filler material in polymer applications may also be of particular advantage. For example, said filler may be used in thermoplastic polymers, such as polyvinyl chloride, polyolefins, and polystyrene which may allow an increased filler load as compared to conventional calcium carbonate fillers.

Moreover, the mineral filler product may also be used in polymer coatings which may be applied on the surface of polymer articles, such as foils, in order to increase the hydrophobicity (e.g., reflected by an increased contact angle measured against water) of said surface.

According to one embodiment, the mineral filler product is used in a polymer composition, wherein said polymer composition comprises:
a) at least one polymeric resin; and
b) from 0.1 to 90.0 wt.-%, preferably from 1.0 to 85.0 wt.-%, and more preferably from 2.0 to 45.0 wt.-%, based on the total weight of said polymer composition, of the mineral filler product obtainable by the process according to the present invention.

According to another embodiment, said at least one polymeric resin is a thermoplastic resin and preferably is a polyolefin, polyvinylchloride, or polystyrene.

According to another embodiment, said at least one polymeric resin is a polyolefin and preferably polyethylene or polypropylene.

According to still another embodiment, said at least one polymeric resin is polyvinylchloride.

According to still another embodiment, said at least one polymeric resin is polystyrene.

The polymer composition of the present invention may be used in a number of processes including the manufacture of blown films, sheets, or pipe profiles, in processes such as extrusion of pipes, profiles, cables, fibres or the like, and in compression molding, injection molding, thermoforming, blow molding, rotational molding, etc.

In this respect, said polymer composition may be directly used in the manufacture of polymer articles. Therefore, in one embodiment of the present invention, the polymer composition comprises the mineral filler product in an amount of from 1 to 50 wt.-%, preferably of from 5 to 45 wt.-% and most preferably from 10 to 40 wt.-%, based on the total weight of the polymer composition.

In an alternative embodiment, the polymer composition may be used as a masterbatch.

The term "masterbatch" refers to a composition having a concentration of the mineral filler product that is higher than the concentration in the polymer composition used for preparing the final application product. That is to say, the masterbatch is further diluted such as to obtain a polymer composition which is suitable for preparing the final application product.

For example, a polymer composition according to the present invention suitable to be used as a masterbatch comprises the mineral filler product in an amount of from 50 to 95 wt.-%, preferably from 60 to 95 wt.-%, and more preferably from 70 to 95 wt.-%, based on the total weight of the polymer composition.

EXAMPLES

The scope and interest of the invention may be better understood on basis of the following examples which are intended to illustrate embodiments of the present invention. However, they are not to be construed to limit the scope of the claims in any manner whatsoever.

Weight Average Molecular Weight $M_W$

The weight average molecular weight $M_W$ as used herein may be determined using GPC (SEC) as follows:

A sample corresponding to 90 mg of dry polymer is introduced into a 10 ml flask and at least 1 ml of 5 M aqueous NaOH is added until the pH value does change by not more than 0.3 pH units within 48 hours. Mobile phase with an additional 0.04 wt.-% of dimethylformamide is added until a total mass of 10 g is reached. The composition of the mobile phase at pH 9 is as follows: 0.05 M $NaHCO_3$, 0.1 M $NaNO_3$, 0.02 M triethanolamine, 0.03 wt.-% of $NaN_3$.

The SEC equipment is consisting of an isocratic Waters™ 515 type pump, the flow rate of which is set to 0.8 ml/min, a Waters™ 717+sample changer, a kiln containing a precolumn type Guard Column Ultrahydrogel Waters™ which is 6 cm in length and has an internal diameter of 40 mm, followed by a linear column type Ultrahydrogel Waters™ which is 30 cm in length and has an internal diameter of 7.8 mm.

Detection is accomplished by means of a Waters™ 410 differential refractometer. The kiln is heated to a temperature of 60° C. and the refractometer is heated to a temperature of 45° C.

The SEC is calibrated with a series of sodium polyacrylate standards supplied by Polymer Standard Service having maximum molecular weight of between 2'000 and $1.10^6$ g/mol and a polydispersity index of between 1.4 and 1.7 and further with a sodium polyacrylate of average weight molecular weight of 5'600 g/mol and a polydispersity index equal to 2.4.

The calibration graph is of the linear type and takes account of the correction obtained using the flow rate marker (dimethylformamide).

Measurement of Volatiles

For the purpose of the present application, the "total volatiles" associated with mineral fillers and evolved over a temperature range of 25° C. to 350° C. is characterized by % of mass loss of a mineral filler sample over a temperature range as read on a thermogravimetric (TGA) curve.

TGA analytical methods provide information regarding losses of mass and volatile onset temperatures with great accuracy. The methods are well-known to the skilled person and described in, for example, "Principles of Instrumental analysis", 5th edition, Skoog Holler Nieman, 1998, chapter 31, pp. 798-800. In the present invention, thermogravimetric analysis (TGA) is performed using a Mettler Toledo TGA 851 based on a sample of 500±50 mg and scanning temperatures of from 25° C. to 350° C. at a rate of 20° C./min under an air flow of 70 ml/min.

The "volatile onset temperature" can be determined as follows by analysis of the TGA curve: The first derivative of the TGA curve is obtained and the inflection points thereon between 150° C. and 350° C. are identified. Among these inflection points having a tangential slope value of greater than 45° relative to a horizontal line, the one having the lowest associated temperature above 200° C. is identified. The temperature associated with this lowest inflection point of the first derivative curve is the "volatile onset temperature".

Particle Size Distribution

For the purpose of the present application, particle sizes being lower than 100 μm, the weight median particle size $d_{50}$ and further granulometric characteristics are determined based on measurements made by using a Sedigraph™ 5100 instrument of Micromeritics Instrument Corporation. The method and the instrument are known to the skilled person and are commonly used to determine the particle size of fillers and pigments. The measurement is carried out in an aqueous solution of 0.1 wt.-% $Na_4P_2O_7$. The samples are dispersed using a high speed stirrer and supersonics. In case of surface-treated products, additional 0.5 g of a surfactant (Photo-Flo 200® from Kodak) were added to 50 ml of the solution of 0.1 wt.-% $Na_4P_2O_7$ before dispersing the treated carbonate sample.

In case of particle sizes being greater than 100 μm, fractional sieving is used to determine granulometric characteristics.

BET Specific Surface Area of a Material

Throughout the present document, the specific surface area (expressed in m²/g) of a mineral filler is determined using the BET method (using nitrogen as adsorbing gas), which is well known to the skilled person (ISO 9277:1995). The total surface area (in m²) of the mineral filler can be obtained by multiplication of the specific surface area (in m²/g) and the mass (in g) of the mineral filler.

Moisture Pick Up Susceptibility

The moisture pick up susceptibility of a material as referred to herein is determined in mg moisture/g after exposure to an atmosphere of 10 and 85% relative humidity, respectively, for 2.5 hours at a temperature of +23° C. (±2° C.). For this purpose, the sample is first kept at an atmosphere of 10% relative humidity for 2.5 hours, then the atmosphere is changed to 85% relative humidity at which the sample is kept for another 2.5 hours. The weight increase between 10 and 85% relative humidity is then used to calculate the moisture pick-up in mg moisture/g of sample.

The moisture pick up susceptibility in mg/g divided by the specific surface area in m² (BET method) corresponds to the "normalized moisture pick up susceptibility" expressed in mg/m² of sample.

Total Moisture Content

The total moisture content as used herein is measured according to the Karl Fischer coulometric titration method, desorbing the moisture in an oven at 220° C. for 10 min and passing it continuously into a KF coulometer (Mettler Toledo coulometric KF Titrator C30, combined with Mettler oven DO 0337) using dry nitrogen at 100 ml/min for 10 min. A calibration curve using water has to be recorded and a blank of 10 min nitrogen flow without a sample has to be taken into account.

Materials

Grinding Agent A

Cray Valley SMA 1000HNa=aqueous solution of hydrolyzed styrene-maleic anhydride co-polymer, 100% sodium neutralized, commercially available from Cray Valley LLC, USA; approx. molecular weight $M_w$=5'000 g/mol; monomer unit ratio (S:MA)=1:1; 37.5 wt.-% grinding agent content; pH=8.5.

Grinding Agent B

Cray Valley SMA 2000HNa=aqueous solution of hydrolyzed styrene-maleic anhydride co-polymer, 100% sodium neutralized, commercially available from Cray Valley LLC, USA; approx. molecular weight $M_w$=7'500 g/mol; monomer unit ratio (S:MA)=2:1; 37.5 wt.-% grinding agent content; pH=8.5.

Grinding Agent C

Cray Valley SMA 3000HNa=aqueous solution of hydrolyzed styrene-maleic anhydride co-polymer, 100% sodium neutralized, commercially available from Cray Valley LLC, USA; approx. molecular weight $M_w$=9'500 g/mol; monomer unit ratio (S:MA)=3:1; 34.8 wt.-% grinding agent content; pH=8.6.

Grinding Agent D

Polyacrylate grinding agent, 50 mol-% sodium neutralized and 50 mol-% magnesium neutralized; approx. molecular weight $M_w$=5'500 g/mol; 38 wt.-% aqueous solution; pH=8.

Example 1

An aqueous slurry of calcium carbonate (marble; $d_{50}$=10 μm; 21%<2 μm) was prepared at 60 wt.-% total moisture content. The slurry was wet ground at 30° C. without grinding agent in a 200 l vertical ball mill to a final particle size distribution as described in Table 1 herein below.

The wet ground mineral filler was spray dried using a Niro spray dryer (GEA Process Engineering A/S, Søborg, Denmark) at 125° C. tower temperature. The properties of the obtained dried mineral filler are summarized in Table 2 herein below.

Subsequently, the dried mineral filler was surface-treated in a Lödige mixer. Prior to treatment, the powder was preheated to 60° C. and then coated with 1.0 wt % of a 1:1 mixture of stearic acid/palmitic acid. The carbonate and fatty acids were mixed for 7 min by use of the main mixer and a high shear mixer. After this period the temperature reached 90° C. Thereafter, the high shear mixer was turned off and the mixture was allowed to cool down to 50° C. using the main mixer only. The properties of the obtained mineral filler product are summarized in Table 3 herein below.

Example 2

The identical procedure as in Example 1 was used, wherein 0.15 wt.-% of grinding agent D were added during preparation of the slurry (28% moisture content) and prior to wet grinding at 76° C.

Example 3

The identical procedure as in Example 1 was used, wherein 0.15 wt.-% of grinding agent A were added during preparation of the slurry (28% moisture content) and prior to wet grinding at 60° C. Further 0.05 wt.-% of grinding agent A were added during the wet grinding step.

Example 4

The identical procedure as in Example 1 was used, wherein 0.15 wt.-% of grinding agent B were added during preparation of the slurry (28% moisture content) and prior to wet grinding at 60° C. Further 0.1 wt.-% of grinding agent B were added during the wet grinding step.

Example 5

The identical procedure as in Example 1 was used, wherein 0.15 wt.-% of grinding agent C were added during preparation of the slurry (28% moisture content) and prior to wet grinding at 60° C. Further 0.17 wt.-% of grinding agent C were added during the wet grinding step.

Example 6

The identical procedure as in Example 1 was used, wherein 0.15 wt.-% of grinding agent A were added during preparation of the slurry (28% moisture content) and prior to wet grinding at 60° C. Further 0.15 wt.-% of grinding agent C were added during the wet grinding step.

Example 7

The identical procedure as in Example 1 was used, wherein 0.08 wt.-% of grinding agent D were added during preparation of the slurry (28% moisture content) and prior to wet grinding at 60° C. Further 0.14 wt.-% of grinding agent C were added during the wet grinding step.

TABLE 1

Properties of wet ground mineral filler.

|  | Ex. 1 | Ex. 2 | Ex. 3 | Ex. 4 | Ex. 5 | Ex. 6 | Ex. 7 |
|---|---|---|---|---|---|---|---|
| Total grinding agent [wt.-%] | 0.00 | 0.15 | 0.20 | 0.25 | 0.32 | 0.25 | 0.22 |
| Solids content after grinding [wt.-%] | 29.9 | 72.0 | 72.2 | 72.1 | 72.1 | 71.0 | 72.0 |
| % < 2 µm | 47.9 | 47.2 | 46.8 | 46.1 | 47.8 | 47.7 | 47.4 |
| % < 1 µm | 26.1 | 29.0 | 28.4 | 27.7 | 29.3 | 29.4 | 28.8 |
| Specific surface area [m$^2$/g] | 3.6 | 5.5 | 6.3 | 6 | 5.5 | 6.2 | 6.1 |
| Viscosity (100 rpm; 1 min) [mPas] | 35 | 250 | 176 | 136 | 181 | 176 | 149 |
| pH | 7.8 | 9.4 | 9.2 | 9.5 | 9.9 | 9.6 | 9.7 |

TABLE 2

Properties of dried mineral filler.

|  | Ex. 1 | Ex. 2 | Ex. 3 | Ex. 4 | Ex. 5 | Ex. 6 | Ex. 7 |
|---|---|---|---|---|---|---|---|
| % < 2 µm | 48.7 | 45.6 | 46.1 | 45.1 | 47.3 | 46.1 | 47.5 |
| % < 1 µm | 26.9 | 26.2 | 27.5 | 27 | 28.6 | 27.1 | 27.9 |
| Specific surface area [m$^2$/g] | 4 | 6.2 | 7 | 6.8 | 6.7 | 7.0 | 7.0 |
| Norm. moisture pick up [mg/m$^2$] | 43 | 58 | 40 | 35 | 36 | 37 | 44 |

TABLE 3

Properties of surface-treated mineral filler product.

|  | Ex. 1 | Ex. 2 | Ex. 3 | Ex. 4 | Ex. 5 | Ex. 6 | Ex. 7 |
|---|---|---|---|---|---|---|---|
| % < 2 µm | 44.8 | 48.7 | 50.9 | 48.1 | 49.7 | 49.8 | 50.3 |
| % < 1 µm | 19.7 | 28.6 | 29.7 | 28 | 28.7 | 28.8 | 30.2 |
| Specific surface area [m$^2$/g] | 2.4 | 4.4 | 4.8 | 4.5 | 4.9 | 5.0 | 5.0 |
| Norm. moisture pick up [mg/m$^2$] | 0.13 | 0.20 | 0.13 | 0.17 | 0.16 | 0.14 | 0.18 |
| Volatile onset [° C.] | 298 | 287 | 286 | 284 | 291 | 285 | 283 |

The invention claimed is:

1. A process for the preparation of a mineral filler product, the process comprising the steps of:
   a) providing a calcium carbonate-containing material;
   b) providing water;
   c) providing at least one grinding agent;
   d) wet grinding the calcium carbonate-containing material in a mixture obtained by contacting:
      i) the calcium carbonate-containing material provided in step a), with
      ii) the water provided in step b), and with
      iii) the at least one grinding agent provided in step c) in any order in at least one grinding unit to obtain a wet ground mineral filler;
   e) optionally classifying the wet ground mineral filler of step d) to obtain a coarse fraction and a fine fraction, wherein the coarse fraction is removed or subjected to wet grinding step d) and the fine fraction represents a fine mineral filler;
   f) drying the wet ground mineral filler of step d) and/or the fine mineral filler of step e) to obtain a dried mineral filler having a total moisture content of less than or equal to 1.0 wt.-%, based on the total weight of said dried mineral filler; and
   g) treating the dried mineral filler of step f) with a hydrophobizing agent to obtain a surface-treated product having a treatment layer on at least part of the surface of said product;
   wherein the total moisture content in the mixture of step d) ranges from 15.0 to 50.0 wt.-%, based on the total weight of said mixture;
   the amount of the at least one grinding agent provided in step c) ranges from 0.01 to 10.0 wt.-%, based on the total dry weight of the calcium carbonate-containing material;
   the temperature in step d) ranges from 60° C. to 150° C.; and
   the at least one grinding agent is selected from the group consisting of styrene-maleic anhydride co-polymers and derivatives of styrene-maleic anhydride co-polymers, said derivatives being selected from styrene-maleic anhydride co-polymers having partially or fully hydrolyzed maleic anhydride units, wherein said grinding agent has a monomer unit ratio (styrene units: maleic anhydride units, S:MA) of from 1:2 to 5:1 and a molecular weight $M_W$ of from 500 to 40,000 g/mol.

2. The process according to claim 1, wherein the calcium carbonate-containing material provided in step a) is natural calcium carbonate.

3. The process according to claim 1, wherein the calcium carbonate-containing material provided in step a) is selected from the group consisting of marble, limestone, chalk, dolomite, and any mixture thereof.

4. The process according to claim 1, wherein the at least one grinding agent provided in step c) has a monomer unit ratio (S:MA) of from 1:1 to 4:1.

5. The process according to claim 1, wherein the at least one grinding agent provided in step c) has a monomer unit ratio (S:MA) of from 1:1 to 3:1.

6. The process according to claim 1, wherein the at least one grinding agent provided in step c) has a monomer unit ratio (S:MA) of from 1:1 to 2:1.

7. The process according to claim 1, wherein the at least one grinding agent provided in step c) has a molecular weight $M_W$ of from 2,000 to 30,000 g/mol.

8. The process according to claim 1, wherein the at least one grinding agent provided in step c) has a molecular weight $M_W$ of from 4,000 to 8,000 g/mol.

9. The process according to claim 1, wherein the at least one grinding agent provided in step c) is partially or fully neutralized with cations selected from the group consisting of lithium, sodium, potassium, calcium, magnesium, ammonium, iminium, and any mixture thereof.

10. The process according to claim 1, wherein the total moisture content in the mixture of step d) ranges from 18.0 to 35.0 wt.-%, based on the total weight of said mixture.

11. The process according to claim 1, wherein the total moisture content in the mixture of step d) ranges from 20.0 to 28.0 wt.-%, based on the total weight of said mixture.

12. The process according to claim 1, wherein the total moisture content in the mixture of step d) ranges from 22.0 to 25.0 wt.-%, based on the total weight of said mixture.

13. The process according to claim 1, wherein the temperature in step d) ranges from 65° C. to 125° C.

14. The process according to claim 1, wherein the temperature in step d) ranges from 70° C. to 115° C.

15. The process according to claim 1, wherein the temperature in step d) ranges from 75° C. to 105° C.

16. The process according to claim 1, wherein the wet ground mineral filler of step d) has a weight median particle $d_{50}$ ranging from 0.1 to 8.0 μm.

17. The process according to claim 1, wherein the wet ground mineral filler of step d) has a weight median particle $d_{50}$ ranging from 0.2 to 5.0 μm.

18. The process according to claim 1, wherein the wet ground mineral filler of step d) has a weight median particle $d_{50}$ ranging from 0.4 to 3.0 μm.

19. The process according to claim 1, wherein the dried mineral filler of step f) has a total moisture content of less than or equal to 0.5 wt.-%, based on the total weight of said dried mineral filler.

20. The process according to claim 1, wherein the dried mineral filler of step f) has a total moisture content of less than or equal to 0.2 wt.-%, based on the total weight of said dried mineral filler.

21. The process according to claim 1, wherein the dried mineral filler of step f) has a total moisture content of between 0.03 and 0.07 wt.-%, based on the total weight of said dried mineral filler.

22. The process according to claim 1, wherein the hydrophobizing agent of step g) is selected from the group consisting of fatty acids having from 6 to 24 chain carbon atoms, mono-substituted succinic anhydrides, alkyl phosphoric acid esters, polyhydrogensiloxane, polydimethylsiloxane, and any mixture thereof.

* * * * *